UNITED STATES PATENT OFFICE.

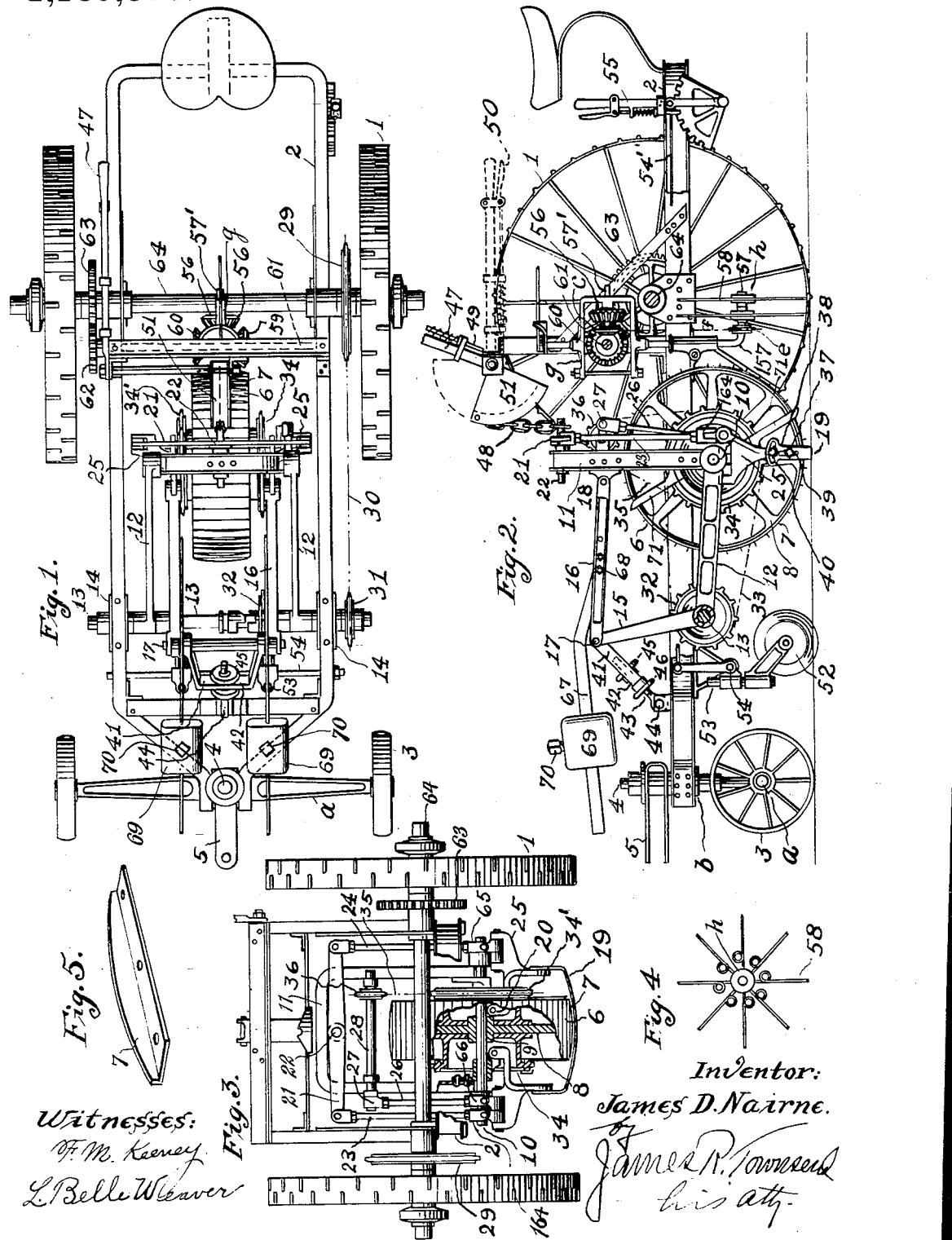

JAMES D. NAIRNE, OF ALHAMBRA, CALIFORNIA, ASSIGNOR TO UNIVERSAL BEET HARVESTER CO., OF LOS ANGELES, CALIFORNIA, A CORPORATION OF CALIFORNIA.

BEET-TOPPER.

1,189,858.   Specification of Letters Patent.   Patented July 4, 1916.

Application filed October 5, 1914. Serial No. 865,199.

*To all whom it may concern:*

Be it known that I, JAMES D. NAIRNE, a citizen of the United States, residing at Alhambra, in the county of Los Angeles and State of California, have invented a new and useful Beet-Topper, of which the following is a specification.

An object of this invention is to provide means whereby the standing beets in a row can be accurately topped, their heads or upper ends being cut off at the proper distance below the top surfaces of the beet bodies respectively, irrespective of the size of the beets or the height to which they project above the ground.

Another object of the invention is to so dispose of the severed beet tops and their foliage as to leave the same in the field out of the way of the paths of the digger and the harvester, which may be attached to or separate from the frame of the topper.

Other objects are cheapness, simplicity and strength of parts combined with lightness, certainty of action, simple adjustability and perfect control by the operator.

In this embodiment of my invention I employ a gage wheel having spurs to crush the foliage and ride on the heads of the beets and positively driven at a determined peripheral speed relative to the peripheral speed of the ground wheels of the machine so that the gage wheel will invariably climb and cling to each beet when it engages the same, and all tendency to knock or butt against the higher beets is avoided.

I also employ an arrangement of a topping knife extending transversely under the gage wheel preferably vertically beneath the shaft of said gage wheel so that the cut is made at a determined distance below the level of the lowermost point of the gage wheel. A narrow cutting blade is also employed to allow the gage wheel to descend quickly from one beet to ride the succeeding beet.

Means to adjust the cutter are also provided.

Other features, advantages and objects may appear from the accompanying drawings and from the subjoined detail description.

The invention may be carried out in various ways and the beet topper may be mounted on a traveling frame constructed to also carry a beet digger and a beet collector, the whole constituting a beet harvester; or the beet topper mechanism may be mounted on the frame independently of any other appliance.

The accompanying drawings illustrate the invention in one of the forms of its embodiment in which the beet topper constitutes a portion of a beet harvesting machine including a digger and a collector, the digging and collecting parts of which are omitted from the views that show a form of frame adapted for the attachment of such parts.

Figure 1 is a plan of a beet topper constructed in accordance with this invention. Fig. 2 is a side elevation of the same. Fig. 3 is an elevation from the rear of the axle of the driving wheels, the frame being sectioned to avoid confusion of lines, and a portion of the gage wheel and a sprocket wheel attached thereto being broken to expose construction that would not otherwise be clearly shown. Fig. 4 is a detail of the brush. Fig. 5 is a perspective view of one of the gage wheel spurs detached.

The master wheels 1 may be of any usual construction suitable for operation in the beet field, and support the traveling frame 2 that also may be of any suitable character. Said traveling frame is carried by said master wheels and the front wheels 3 which likewise run upon the ground, being connected by the axle $a$, bolster $b$ and king bolt 4 with said frame 2. A draft appliance 5 of any suitable construction may be provided to move the implement over the ground.

A beet climbing element is adjustably mounted relative to the frame 2 and comprises a gage wheel having a broad tread 6 and transverse blade-like spurs 7 to engage the top foliage and head of the beet and to hold the same while being cut. Preferably said spurs are radial arc-edged blades extending clear across the tread 6 of the wheel and said gage wheel is constructed with tread supported spokes or web 8 arranged midway between the edges of the tread 6 and connected to a hub 9 on axle 10 that is journaled to a carrying frame which is preferably a pantograph frame comprising the main upright 11 and base 12 journaled on a common axle 10 and extending in angular relation to each other; said base 12 being also journaled on a shaft 13 mounted in boxing 14 on the traveling frame 2; there being also pivotally connected upright and top limbs 15, 16 jointed to the base and main upright, and jointed together at 17; the upright limb 15 being journaled on the shaft 13 and the top limb 16 being journaled at 18 on the upright member 11. The upright 11, base 12 and limbs 15, 16 pivoted together at 10, 13, 17 and 18 adjustably connect the gage wheel with the traveling frame.

A transverse cutter 19 is pivotally connected to the gage wheel and also to the carrying frame and extends beneath the gage wheel and is curved in an arc corresponding to that of the gage wheel spur edges. The pivotal connection between said cutter and the gage wheel and carrying frame may be constructed in any satisfactory manner and the cutter is designed to be swung longitudinally of the cutter and transversely of the gage wheel by suitable mechanism; said cutter being shown as a somewhat flexible bent blade supported on pivots 20 that are located inside the tread of the wheel, the flexibility of the blade being sufficient to allow the blade to be swung with a sawing motion beneath the gage wheel.

A walking beam 21 is journaled at 22 to the upright 11 of the carrying frame and is connected by two connecting rods 23, 24, with the opposite ends of the cutter 19 through the bell crank hangers 25 that connect the ends of the blade 19 with the pivots 20. One of said hangers is connected by a pitman 26 with a crank 27 on a shaft 28 journaled to the main upright 11 of the carrying frame and driven by any suitable means as indicated by the train shown comprising a main sprocket wheel 29 in fixed relation to and rotating with the master wheel 1, a first sprocket chain 30, connecting the main sprocket wheel with a second sprocket wheel 31, that is journaled coaxially of the carrying frame shaft 13; a third sprocket wheel 32 in fixed relation to the second sprocket wheel 31; a second sprocket chain 33 connecting the third sprocket wheel 32 with a fourth sprocket wheel 34 that is mounted coaxially of the gage wheel, and by means of sprocket wheel 34', also coaxial with the gage wheel drives a fourth sprocket chain 35 that in turn drives the crank driving sprocket wheel 36, which is fixed on the crank shaft 28 to drive the crank 27, thereby to reciprocate the cutter underneath the gage wheel to sever the top of the beet upon which the gage wheel may ride.

Means are provided for adjusting the cutter relative to the gage wheel and carrying frame. Said adjusting means are shown in the drawings as bolts 37, 38 in slots 39, 40 by which the cutter is adjustably connected with the hangers 25.

The pantograph carrying frame is loose jointed and means are provided to hold the parts thereof in position to maintain the main upright 11 in a desired position. Such means may be variously constructed and in the drawings are shown as an extensible brace comprising a link 41 pivoted on the upper front pantograph frame axis 17 and having a purchase 42 through which there slides a temper screw 43 that is carried by the traveling frame; said brace being journaled on a horizontal axis 44 that is in fixed relation to the traveling frame 2.

Wheel nuts 45, 46 are arranged below and above the purchase 42 which they bear upon to adjust the brace as to length and to lock it in the adjusted position. The brace acts between the axes 17 and 44, and the traveling frame 2 and axis 13; thus maintaining the upright limb 15 at any desired angle so that the main upright 11 will be held in a determined position relative to the horizontal as said upright 11 is raised and lowered. Such raising and lowering may occur through the action of the gage wheel as it rides up and down over the irregularities of the surface or surfaces on which it travels. If the adjustable brace is extended, the top limb 16 of the pantograph frame will be forced rearward thus swinging the main upright 11 rearwardly at the top and forwardly at the bottom thereby bringing the cutter 19 to a forward position. By shortening the brace the cutter will be thrown rearwardly relative to the gage wheel.

That portion of the cutter 19 which runs beneath the gage wheel may be of any desired dimensions; it is preferably a narrow blade of considerable thickness, being for instance, two inches in width and one-quarter inch thick at the rear edge, the front edge being sharp so as to readily cut through the beet. Said front edge may be variously formed after the shapes of similar cutters, and at present it is deemed most advisable to provide the cutter with a sinuous edge after the fashion of the edge of certain well known bread and cake knives.

Means to bodily hoist the gage wheel and cutter are provided so that when it is desired to travel aside or away from a beet row, the rear end of the pantograph frame together with the gage wheel and cutter may be raised. Such means may be of any desired character, and in the drawings are shown as a hand lever 47 and a connection 48 connected with the main upright 11. Said hand lever 47 is provided with the usual ratchet 49 under the control of the latch handle 50 so that when the lever is pulled back and the gage wheel raised from the ground it may be held by the ratchet 49. Said hand lever 47 is provided with a grooved quadrant 51 for the connection which is thus constructed so that the lifting force will be applied in a direct line, to hold the gage wheel and frame.

Vertically adjustable colters 52 are mounted on the traveling frame 2 to run forwardly relative to the gage wheel to cut along each side of the beet row preparatory to the operation of the digger not shown. Said colters are mounted on the swivel posts 53 that swing on the horizontal axis 54 and are moved into and from the ground by means of connecting rod 54' and lever 55.

For the purpose of disposing of the severed beet tops, a revolving brush is arranged rearwardly of the gage wheel. Said brush comprises a hub $h$ mounted on a horizontal swinging shaft 57 and provided with a plurality of strong resilient arms 58 which may be made of wires. Said brush is revolved rapidly by means of sprocket $c$ driven by bevel gear 56, a sprocket $s$, driving hub $h$ and a chain $f$ connecting the sprockets $c$, $e$. Bevel gear 56 is mounted on shaft 57' fixed in swivel frame $g$, and located between two bevel gears 59, 60 that are fixed to and rotate with a shaft 61 having fixed thereon a pinion 62 driven by a spur wheel 63 fixed on the shaft 64 that rigidly connects the master wheels 1 together and that also connects with said master wheels the main sprocket wheel 29 so that the master wheels drive the gage wheel and beet leaves brush when the machine is traveling and the parts are in gear.

The swinging shaft 57 is mounted in any suitable way as by a vertical swivel shaft 157 to allow the shafts 57, 57' and the bevel gear 56 to be swung into three positions. The neutral position brings said bevel gear 56 midway between the driving bevel wheels 59, 60 and allows the brush to remain stationary while the machine is running. By throwing the shaft 57' from one side to the other, the brush-bevel gear 56 will mesh either with the driving bevel gear 59 or the bevel driving gear 60 to rotate the brush arms in one and the other direction alternatively.

The axis of the brush in the neutral position is at right angles to the axis of the gage wheel, and in the operating position said axis is at an oblique angle either right or left to said gage wheel axis, the bevel gear 56 being then in mesh with one or the other of the driving bevel gear wheels.

When operated, the brush arms are made to revolve in a plane oblique to the path of the topper and consequently oblique to the row of beets along which the machine travels and will therefore throw said beet tops in one or the other direction away from the beet row.

The train of sprocket wheels and chains between the ground wheels and the gage wheel is speed-increasing so that the peripheral speed of the gage wheel will be about 25%, more or less, greater than the peripheral speed of the ground wheels and therefore the gage wheel will have a tendency to climb over and run beyond any object that is fixed relative to the ground over which the machine travels. This action also has a tendency to hold the foliage and top of beet with which the spurs engage in place while the cutting takes place and leaves the slice of beet with the foliage attached lying in position on the beet after the same is cut.

In practical operation when the machine is brought into position ready to be driven along a row of beets, the gage wheel will be lowered and the cutter rests on the ground, and as the machine moves forward the cutter may enter the ground while the gage wheel runs on the surface until the gage wheel comes into and holds contact with a beet, whereupon the gage wheel immediately climbs the beet and the cutter beneath the same passes through the beet at a depth below the crown of the beet that is gaged by the space between the gage wheel and the cutter.

It is necessary that there be sufficient flexibility of the connections with the transverse part of the cutter to allow the cutter to be moved freely with a sawing motion to and fro across the beets, this is effected by suitably placing universal joints 164, 65 and 66 where required to prevent binding of bearings.

The gage wheel and cutter mounted on the journaled carrier frame together with the crank shaft, walking beam and hangers and their connecting rods are of considerable weight and in order to enable the operator to so adjust the pressure of the gage wheel on the beet top as to secure the most satisfactory action, adjustable counterbalancing means are provided for counterbalancing said parts. Such means may be of various forms and construction and are shown in the drawings as constructed of arms or bars 67 adjustably fixed by bolts 68 to the top limb 16 of the journaled carrier frame and extending across the axle 13 on which the carrier frame is journaled, and adjustable means to move said arms to counterbalance said carrier frame and the parts carried thereby are provided in the form of weights 69 slidable along said arms and fixed in place by set screws 70. By properly adjusting the counterbalance means the gage wheel may be made to ride over the crowns of the beets with just the pressure required to break down the strongest beet foliage and allow the gage wheel to bring the cutter to the proper level to top that beet. In this way the pressure on each foliage top will be sufficient to break it down, and yet the gage wheel will not damage the beets having weaker foliage.

To prevent the leaves and severed beet tops from clogging the knife 19, a plurality of knives 71 are arranged on each side of the gage wheel, there being preferably two knives secured to each of the sprocket wheels 34, 34'. The knives 71 extend to within one-fourth of an inch of knife 19, and rotate in unison with the gage wheel, thereby cutting the leaves before the advancing gage wheel and preventing said leaves and the severed beet tops from interfering with knife 19.

I claim:

1. A beet topper comprising a beet climbing element and a transversely curved cutter under said element.

2. A beet topper comprising a transversely curved beet climbing element and a transversely curved cutter under said element.

3. The combination with a gage wheel to ride on the tops of beets; of a cutter connected to and running beneath the gage wheel to sever the beet bodies below the tops thereof; and means to swing said cutter in an arc transversely of the gage wheel.

4. The combination with a carrying frame, of a gage wheel journaled to the frame to ride on the tops of beets; a cutter pivoted to the frame and running beneath the gage wheel to sever the beet bodies below the tops thereof; and means to swing said cutter in an arc transversely of the gage wheel.

5. The combination with a carrying frame, of a gage wheel journaled to the frame to ride on the tops of the beets; a cutter pivoted to the frame and running beneath the gage wheel to sever the beet bodies below the tops thereof; a walking beam connected to the ends of the cutter; and means to operate the walking beam to swing said cutter in an arc transversely of the gage wheel.

6. The combination with a beet climbing gage wheel, of an axle supported by said wheel; a frame journaled on the axle; hangers pivotally connected to the frame on opposite sides of the mid-plane of the wheel; a walking beam journaled on the frame; connecting rods between the walking beam and the hangers; a cutter extending beneath the gage wheel and connected to the hangers; and means to swing the hangers.

7. The combination with a beet climbing gage wheel having a broad tread, of an axle supported by said wheel; a frame journaled on the axle; hangers pivotally connected to the frame on opposite sides of and close to the mid-plane of the wheel; a walking beam journaled on the frame; connecting rods between the walking beam and the hangers; a cutter extending beneath the gage wheel and connected to the hangers; and means to swing the hangers.

8. The combination with a beet climbing gage wheel having a broad tread, of an axle supported by said wheel; a frame journaled on the axle; hangers pivotally connected to the frame on opposite sides of and close to the mid-plane of the wheel; a walking beam journaled on the frame; connecting rods between the walking beam and the hangers; a cutter extending beneath the gage wheel and connected to the hangers; means to swing the hangers; and means to adjust the cutter up and down relative to the gage wheel.

9. The combination with a beet climbing gage wheel having a broad tread, of an axle supported by said wheel; a frame journaled on the axle; hangers pivotally connected to the frame on opposite sides of and close to the mid-plane of the wheel; a walking beam journaled on the frame; connecting rods between the walking beam and the hangers; a cutter extending beneath the gage wheel and connected to the hangers; means to swing the hangers, and means to adjust the cutter forward and back relative to the gage wheel.

10. The combination with a beet climbing gage wheel having a broad tread, of an axle supported by said wheel; a frame journaled on the axle; hangers pivotally connected to the frame on opposite sides of and close to the mid-plane of the wheel: a walking beam journaled on the frame; connecting rods between the walking beam and the hangers; a cutter extending beneath the gage wheel and connected to the hangers; means to swing the hangers; and means to adjust the cutter up and down and forward and back relative to the gage wheel.

11. A gage wheel having a transversely curved tread and a cutter therebeneath curved concentrically with said tread.

12. A gage wheel having a transversely curved tread and a cutter therebeneath curved concentrically with said tread, and means to swing said cutter transversely of the tread.

In testimony whereof, I have hereunto set my hand at Los Angeles, California this 29th day of September 1914.

JAMES D. NAIRNE.

In presence of—
JAMES R. TOWNSEND,
A. F. LE GAYE.